(12) United States Patent
Finn

(10) Patent No.: US 7,479,085 B2
(45) Date of Patent: Jan. 20, 2009

(54) AXLE HAVING DUAL PLANETARY REDUCTION

(75) Inventor: Jeffrey Brengle Finn, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 262 days.

(21) Appl. No.: 11/450,989

(22) Filed: Jun. 12, 2006

(65) Prior Publication Data

US 2007/0287568 A1    Dec. 13, 2007

(51) Int. Cl.
*F16H 48/06* (2006.01)
(52) U.S. Cl. ..................... 475/225; 475/221
(58) Field of Classification Search .............. 475/205, 475/221, 225; 180/372
See application file for complete search history.

(56) References Cited

U.S. PATENT DOCUMENTS 1,954,686 A * 4/1934 Stickney ................. 475/205
3,452,612 A    7/1969 Casey
2006/0025273 A1* 2/2006 Gradu ...................... 475/225

FOREIGN PATENT DOCUMENTS

| DE | 197 41 207 | 4/1998 |
|----|------------|--------|
| FR | 881 038 | 4/1943 |
| FR | 2 195 200 | 3/1974 |
| FR | 2 712 852 | 6/1995 |
| GB | 2 124 166 | 2/1984 |

OTHER PUBLICATIONS

European Search Report, Sep. 19, 2007, 7 Pages.

* cited by examiner

*Primary Examiner*—Sherry L Estremsky
*Assistant Examiner*—Edwin A Young

(57) ABSTRACT

An axle assembly for a motor vehicle includes a pair of axle half-shafts that are adapted to transfer rotational motion to a pair of spaced apart wheels. A differential is positioned between the axle half-shafts and a dual planetary gear set is positioned between and interconnects each axle half-shaft to the differential. Each dual planetary gear set includes a first planetary gear set and a second planetary gear set mounted adjacent one another, back to back, and having a shared ring gear.

15 Claims, 3 Drawing Sheets

AXLE HAVING DUAL PLANETARY REDUCTION

BACKGROUND

1. Field of the Invention

The invention generally relates to the drivetrain for an off highway agricultural vehicle. More specifically, the invention relates to an axle having a differential positioned between two axle half-shafts, and incorporates a dual planetary gear set between and interconnecting each axle half-shaft to the differential.

2. Related Technology

In general, off highway and agricultural vehicle power levels are increasing at an exponential rate. Axles are traditionally the drive train component most sensitive to the increase in power because of the high gear reductions and increased vertical loads that are synonymous with higher power. Axles generally provide in the range of 25:1 to 50:1 reductions in input speed, creating high torque levels in the rotating components, and having a negative impact on axle life and reliability. Traditionally, agricultural axles include a three pinion, single inboard planetary gear set.

The most common solution for handling additional power has been to increase the size of the components. However, on large machines, the component sizes have grown outside of the conventional manufacturing limits, thereby making such components very expensive to manufacture. Additionally, many vehicles must remain compact due to performance and/or space limitations. Axles having such large sized components often to do not fit within the desired vehicle design.

Conventional axles typically have two large input speed reductions. First, there is approximately a 6:1 reduction in the differential. Then, a planetary gear set, positioned between the differential and the axle half-shaft, provides a second reduction of approximately 6:1. This achieves an over-all reduction of approximately 36:1. The torque levels associated with the 6:1 reduction within the differential and within the planetary gear set require larger, heavier components as mentioned before. The larger the relative reduction, the larger the torque loads will be.

Therefore, there is a need for an axle assembly that will accommodate the higher loads associated with increased power output of modern agricultural vehicle, while being compact enough to fit within limited packaging constraints.

SUMMARY

An axle assembly in accordance with the teachings of the present invention includes a pair of axle half-shafts adapted to transfer rotational motion to a pair of wheels spaced from one another, a differential positioned between the axle half-shafts and adapted to transfer rotational motion from a transmission of the motor vehicle to the axle half-shafts, and a planetary gear set positioned between and interconnecting each axle half-shaft and the differential. Each planetary gear set is a dual planetary gear set includes a first planetary gear set and a second planetary gear set mounted adjacent one another, back to back, and having a shared ring gear that is non-rotatably mounted within the axle assembly.

The differential comprises a differential housing, a pair of bevel output gears substantially axially aligned and spaced apart from each other, wherein each of the bevel output gears is supported by the differential housing for relative rotation therebetween and engages an output shaft. A plurality of rotatable pinion gears are spaced apart from one another and are positioned between and engage the bevel output gears. A ring gear is mounted generally externally to the differential housing is engaged with a bevel drive gear that is adapted to transfer rotational motion from a transmission of the vehicle to the ring gear. Thus, rotational motion is transferred through the pinion gears and the bevel output gears to the output shafts of the differential.

The first planetary gear set of each dual planetary gear set includes a first sun gear that is mounted onto a distal end of one output shaft of the differential. The first sun gear is engaged with a plurality of first planet gears that are supported on a first carrier and that are also engaged with a ring gear shared with the second planetary gear set.

The second planetary gear set of each dual planetary gear set includes a second sun gear that is rotatably mounted within the axle assembly. The second sun gear is engaged with a plurality of second planet gears that are supported on a second carrier and are also engaged with the shared ring gear.

The first carrier is engaged with the second sun gear such that the second sun gear unitarily rotates with the first carrier. Further, the second carrier is engaged with the axle half-shaft such that the axle half shaft rotates unitarily along with the second carrier.

In another aspect, each of the first and second planetary gear sets provides a speed reduction of between about 3:1 and 4:1, and the differential provides a speed reduction of between about 3:1 and 4:1, such that the axle assembly provides an overall speed reduction of between about 27:1 and 48:1.

DESCRIPTION OF THE DRAWINGS

The above, as well as other advantages of the present invention will become readily apparent to those skilled in the art from the following detailed description of a preferred embodiment when considered in the light of the accompanying drawings, which include.

DESCRIPTION OF THE EMBODIMENTS

Figure 1:
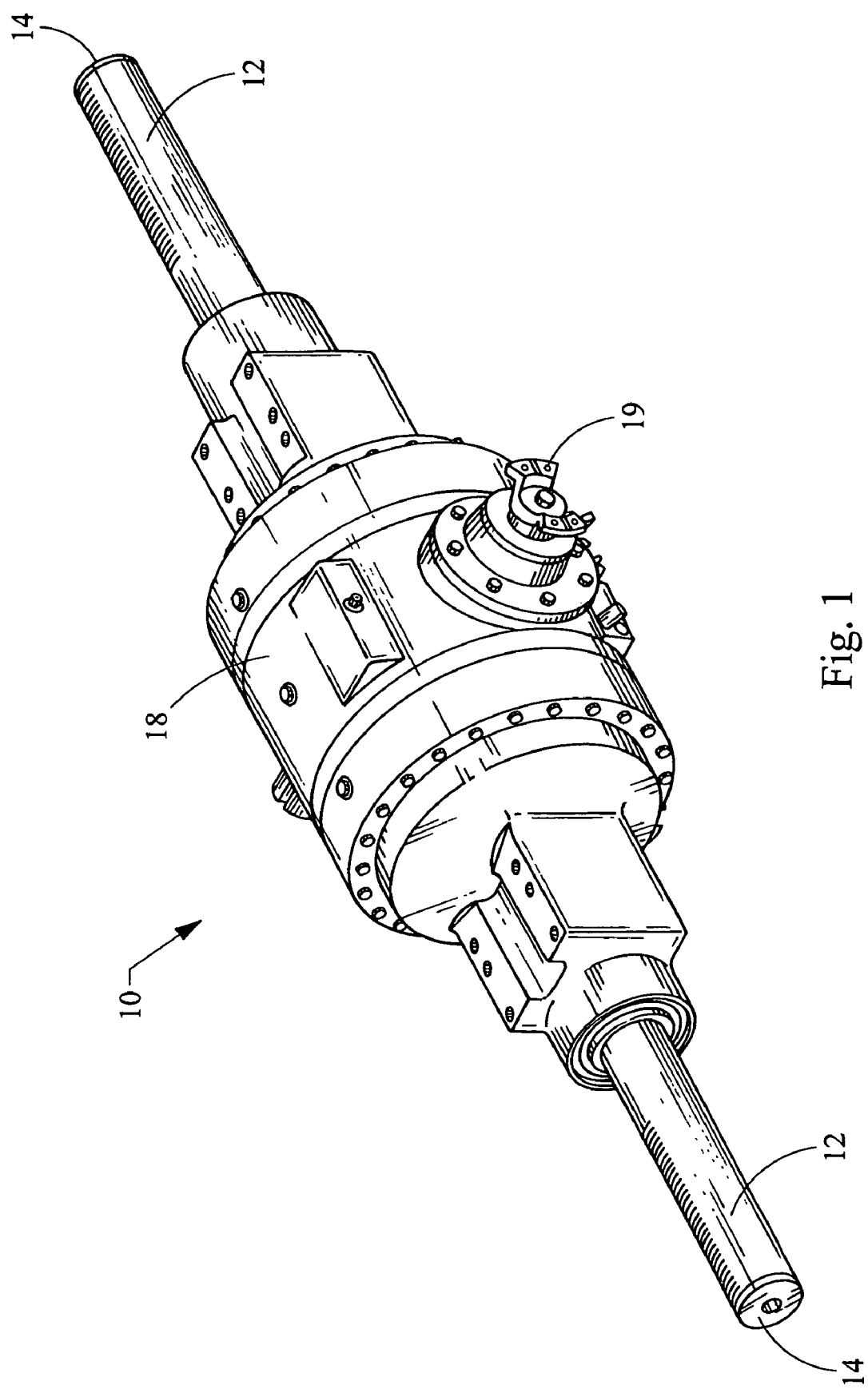
FIG. 1 is a perspective view of an axle assembly in accordance with the teachings of the present invention.

Referring now to FIG. 1, an axle assembly for a motor vehicle having features in accordance with the accompanying claims is shown generally at 10. The axle assembly 10 includes a pair of axle half-shafts 12, each of which is adapted to have a wheel (not shown) mounted at a distal end 14 thereof. A differential 16 is positioned within a casing 18 and between the axle half-shafts 12. The differential 16 functions to transfer rotational motion from the transmission (not shown) of the vehicle to the axle half-shafts 16. Rotation from the transmission is received via an input flange 19 coupled to the differential 16.

Figure 2:
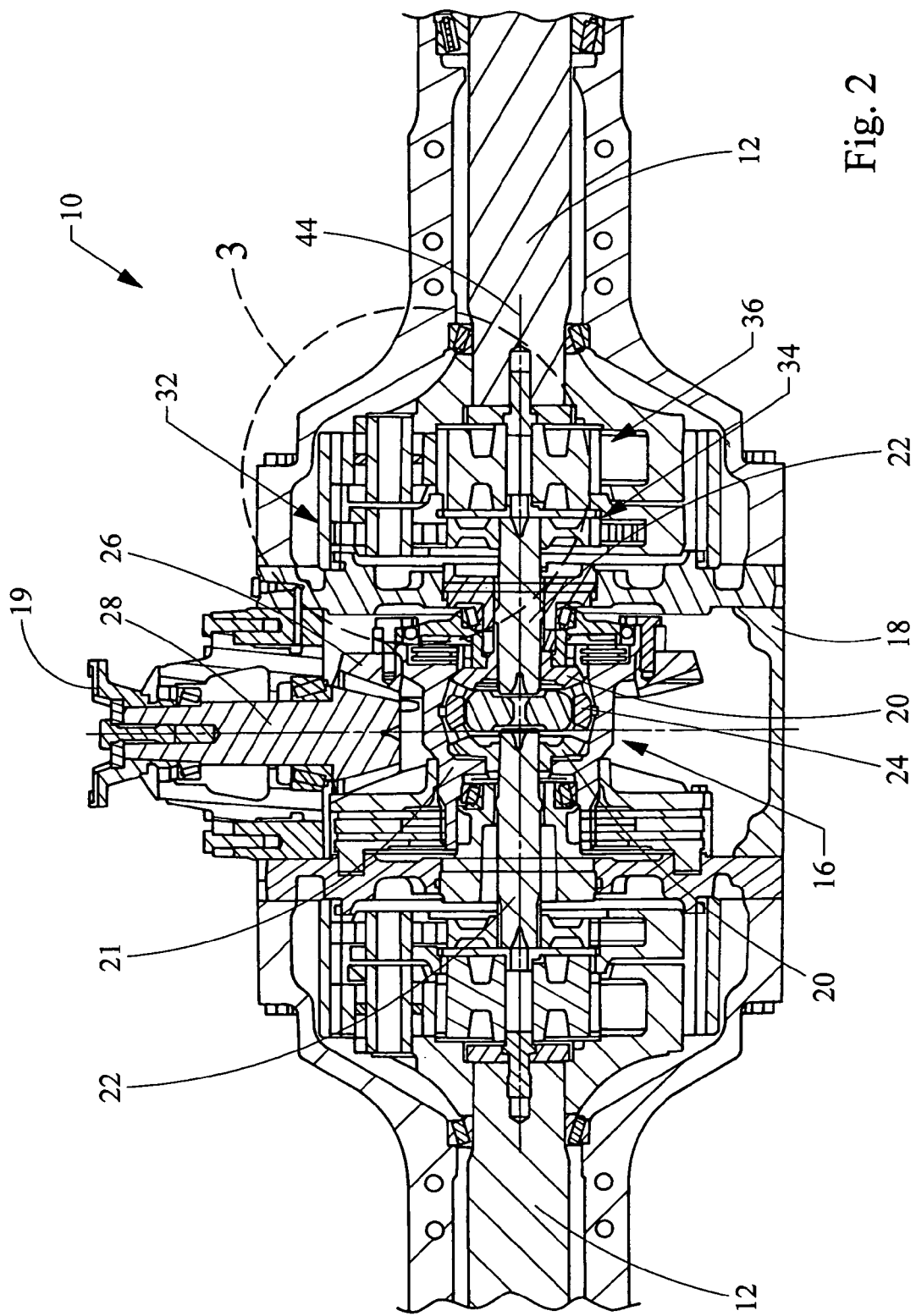
FIG. 2 is a sectional view of the axle assembly taken generally along lines 2-2 of FIG. 1.

Referring to FIG. 2, the differential 16 includes a pair of bevel output gears 20 that are rotatably mounted within a differential housing 21 and positioned substantially axially aligned and spaced apart from one another. Each of the bevel output gears 20 engages and drives an output shaft 22.

At least a pair of rotatable pinion gears 24 are spaced apart from one another and positioned between and interconnect the bevel output gears 20. The pinion gears 24 are rotatably supported on axles by a rotatable bell housing 21 and, as such, the pinion gears 24 are rotatable with the housing 21. A ring gear 26 is mounted generally externally to the housing 21.

The ring gear 26 meshes with a bevel gear drive shaft 28 (that includes a bevel gear portion unitarily formed with an input shaft portion) coupled to the input flange 19. Thus, the bevel gear drive shaft 28 transfers rotational motion from the transmission of the vehicle to the ring gear 26, whereby that rotational motion is transferred through the housing 21, pinion gears 24 and the bevel output gears 20 to the output shafts 22 of the differential 16.

A dual planetary gear set 32 is positioned between and interconnects the differential 16 with each of the axle half-shafts 12. The dual planetary gear set 32 provides a speed reduction between the differential 16 and the axle half-shafts 12. Each dual planetary gear set 32 includes a first planetary gear set 34 and a second planetary gear set 36, which are mounted adjacent one another, back to back. Since the dual planetary gear sets 32 are identical in construction and mirror images of one another, only one of them needs to be and will be described in detail herein. In the discussion that follows, the dual planetary gear set 32 on the right hand side of FIG. 2, generally enclosed by circle 3, is illustrated in FIG. 3.

Figure 3:
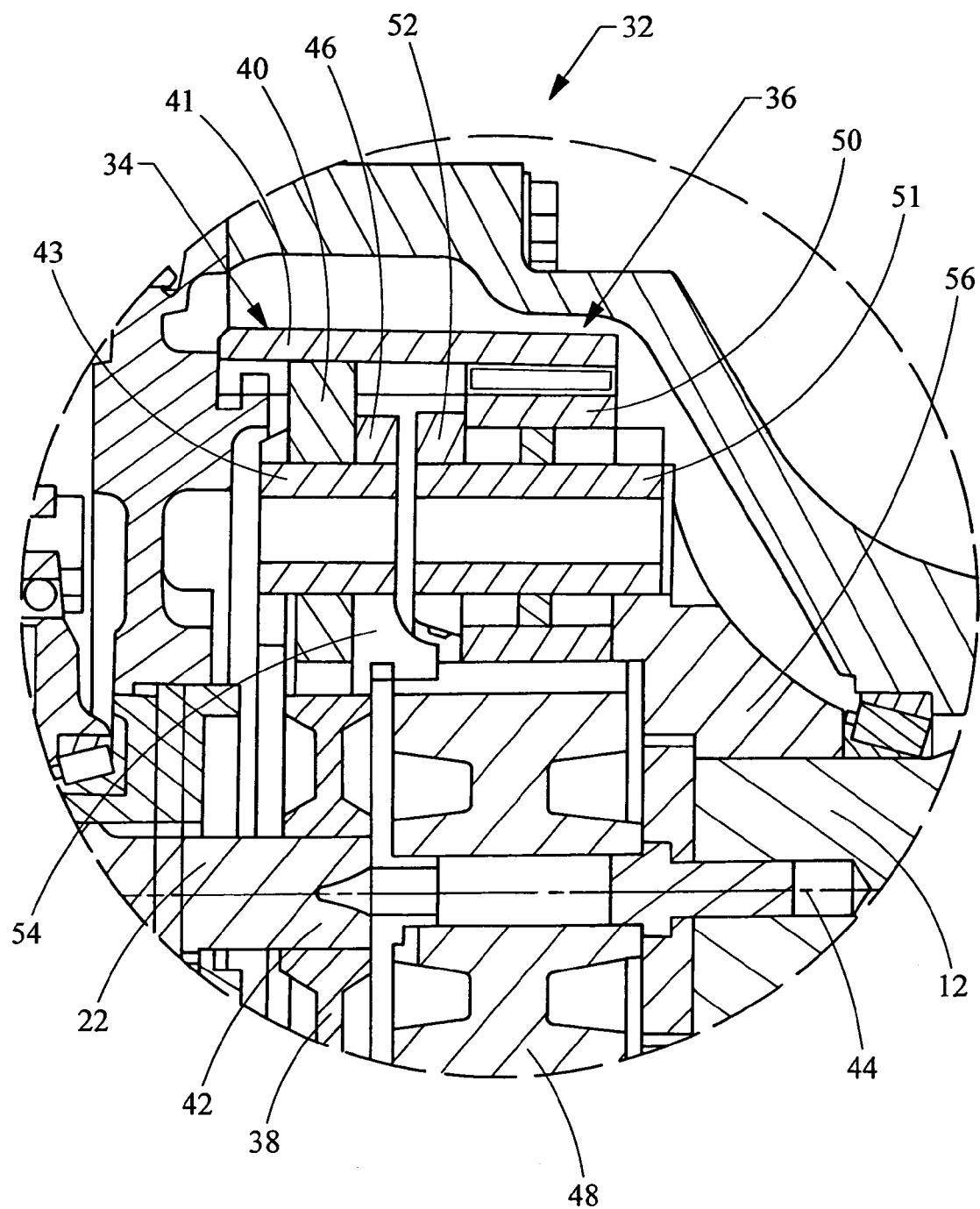
FIG. 3 is an enlarged view of the portion of FIG. 2 encircled by line "3".

Referring now to FIG. 3, the first planetary gear set 34 includes a first sun gear 38, and a plurality of first planet gears 40 mounted between and in meshing engagement with the first sun gear 38 and a shared ring gear 41, which is fixed in position. The first sun gear 38 mounted onto a distal end 42 of the output shaft 22 of the differential 16 and rotates about an axis 44 defined by the output shaft 22 and half shafts 12. While any appropriate number may be used, as shown, five planet gears 40 are positioned radially between and in meshing engagement with the first sun gear 38 and the shared ring gear 41. Each of the planet gears 40 is rotatable about a planet shaft 43 that is supported by a first carrier 46, which is also rotatable about the axis 44. The first carrier 46 is therefore considered the output from the first planetary gear set 34.

The second planetary gear set 36 includes a second sun gear 48 that is rotatably mounted about the axis 44. As shown, five planet gears 50 are positioned radially between and in meshing engagement with the second sun gear 48 and the shared ring gear 41. As with the first planetary gear set 34, any appropriate number of planet gears 50 could be used in the second planetary gear set 36. The planet gears 50 are rotatable about planet shafts 51 that are supported by a second carrier 52, which is rotatable about the axis 44.

The first carrier 46 includes an axially extending spline 54 that engages the teeth of the second sun gear 48. Thus, the first carrier 46 and the second sun gear 48 unitarily rotate about the axis 44. Similarly, the second carrier 52 includes an axially extending sleeve 56 that fixedly engages (through a spline or similar engagement) the axle half-shaft 12. Thus, the second carrier 52 and the axle half-shaft 12 unitarily rotate about the axis 44.

As constructed above, rotational movement is transferred from the output shaft 22 of the differential 16, to the first sun gear 38. As the first sun gear 38 rotates, the planet gears 40 that are positioned between the first sun gear 38 and the shared ring gear 41 rotate because the ring gear 41 is stationarily mounted. The rotation of the planet gears 40 causes the planet gears 40 to travel around the ring gear 41 in an orbital pattern around the first sun gear 38. As the planet gears 40 move, the first carrier 46 is also caused to rotate about the axis 44. In a preferred construction, the first planetary gear set 34 provides an input speed reduction ratio of between about 2:1 and 7:1, and more preferably between about 3:1 and 4:1, between the output shaft 22 of the differential 16 and the first carrier 46.

The spline 54 extending from the first carrier 46 engages the second sun gear 48 such that the second sun gear 48 rotates about the axis 44 along with the first carrier 46. Rotation of the second sun gear 48 causes the planet gears 50, positioned between the second sun gear 48 and the shared ring gear 41 to rotate. The ring gear 41, being stationary, causes the planet gears 50 to travel around the ring gear 41 in an orbital pattern around the second sun gear 48. As the planet gears 50 move, the second carrier 52 is caused to rotate about the axis 44. The second planetary gear set 36, in a preferred construction, provides an input speed reduction ratio of between about 2:1 and 7:1, and more preferably between about 3:1 and 4:1 from the first carrier 46 and the second carrier 52. The extending sleeve 56 of the second carrier 52 engages the axle half-shaft 12 such that rotational motion is transferred to the axle half-shaft 12 and the wheels of the vehicle.

Preferably, the differential 16 provides speed reduction between the bevel gear drive shaft 28 and the output shaft 22 such that the differential 16 and the dual planetary gear set 32 provide a total speed reduction in a range that is typical in the industry. Based on the more preferred embodiments of this invention, that range would generally be between about 27:1 and 48:1. Thus, the total speed reduction is provided by three individual reductions, rather than only two. As a result, components within the differential 16 and each of the first and second planetary gear sets 34, 36 experience lower toque loads and can be designed smaller, lighter, and less expensive.

It is therefore intended that the foregoing detailed description be regarded as illustrative rather than limiting, and that it be understood that it is the following claims, including all equivalents, that are intended to define the spirit and scope of this invention.

What is claimed is:

1. An axle assembly for a motor vehicle comprising:
   a pair of rotatably supported axle half-shafts adapted to transfer rotational motion to a pair of wheels spaced from one another;
   a differential positioned between the axle half-shafts and including a differential input adapted to receive rotational motion from a transmission of the motor vehicle;
   a dual planetary gear set positioned between and interconnecting each axle half-shaft and the differential, each of the dual planetary gear sets including a first planetary gear set and a second planetary gear set mounted adjacent one another and having a shared ring gear that is stationarily mounted within the axle assembly.

2. The axle assembly of claim 1, wherein the differential includes:
   a rotatable housing;
   a pair of bevel output gears substantially axially aligned and spaced apart from each other, each of said bevel output gears being supported for relative rotation therebetween and engaging an output shaft;
   a plurality of rotatable pinion gears supported by the housing and spaced apart from one another, the pinion gears being positioned between and engaging the bevel output gears;
   a ring gear mounted so as to rotate therewith, to the housing, the ring gear engaging a bevel drive gear coupled to the differential input, such that rotational motion is transferred through the pinion gears and the bevel output gears to the output shafts of the differential.

3. The axle assembly of claim 2, wherein the first planetary gear set of each dual planetary gear set includes a first sun gear that is mounted onto a distal end of one output shaft of the differential, the first sun gear engaging a plurality of first planet gears that are supported rotatably on a first carrier and that are also engaged with the shared ring gear; and wherein the second planetary gear set of each dual planetary gear set includes a second sun gear that is engaged with a plurality of second planet gears that are rotatably supported on a second carrier and that are also engaged with the shared ring gear.

4. The axle assembly of claim 3, wherein the first carrier is engaged with the second sun gear such that the second sun gear unitarily rotates with the first carrier.

5. The axle assembly of claim 3, wherein the second carrier is engaged with the axle half-shaft such that the axle half shaft unitarily rotates with the second carrier.

6. The axle assembly of claim 1 wherein each of the first and second planetary gear sets provide a speed reduction of between about 2:1 and 7:1.

7. The axle assembly of claim 1 wherein each of the first and second planetary gear sets provide a speed reduction of between about 3:1 and 4:1.

8. The axle assembly of claim 1 wherein the differential provides a speed reduction of between about 2:1 and 7:1.

9. The axle assembly of claim 1 wherein the differential provides a speed reduction of between about 3:1 and 4:1.

10. The axle assembly of claim 1 wherein the differential and the dual planetary gear set cooperate to provide a speed reduction of greater than 16:1.

11. The axle assembly of claim 1 wherein the first and second planetary gear sets each includes five planet gears.

12. The axle assembly of claim 1 wherein the first and second planetary gear sets each includes at least three planet gears.

13. The axle assembly of claim 1, wherein the first planetary gear set of each dual planetary gear set includes a first sun gear that is mounted onto a distal end of one output shaft of the differential, the first sun gear engaging a plurality of first planet gears that are supported rotatably on a first carrier and that are also engaged with the shared ring gear; and wherein the second planetary gear set of each dual planetary gear set includes a second sun gear that is engaged with a plurality of second planet gears that are rotatably supported on a second carrier and that are also engaged with the shared ring gear.

14. The axle assembly of claim 13, wherein the first carrier is engaged with the second sun gear such that the second sun gear unitarily rotates with the first carrier.

15. The axle assembly of claim 13, wherein the second carrier is engaged with the axle half-shaft such that the axle half shaft unitarily rotates with the second carrier.

* * * * *